(12) United States Patent
Maly et al.

(10) Patent No.: US 8,693,661 B2
(45) Date of Patent: Apr. 8, 2014

(54) APPARATUS AND METHODS FOR PROTECTION FROM INAPPROPRIATE PHONE-DIALING

(75) Inventors: Lisa F. Maly, LaPorte, CO (US); John W. Maly, LaPorte, CO (US)

(73) Assignee: John Maly & Associates, Inc., Nassau (BM)

( * ) Notice: Subject to any disclaimer, the term of this patent is extended or adjusted under 35 U.S.C. 154(b) by 1008 days.

(21) Appl. No.: 12/416,926

(22) Filed: Apr. 2, 2009

(65) Prior Publication Data
US 2010/0254525 A1 Oct. 7, 2010

(51) Int. Cl.
*H04M 3/42* (2006.01)

(52) U.S. Cl.
USPC ............. 379/207.03; 379/201.07; 379/201.08

(58) Field of Classification Search
USPC ........................... 379/207.03, 201.07, 201.08
See application file for complete search history.

(56) References Cited

U.S. PATENT DOCUMENTS

| | | | |
|---|---|---|---|
| 4,670,747 A | | 6/1987 | Borras et al. |
| 5,241,583 A | | 8/1993 | Martensson |
| 5,572,577 A | * | 11/1996 | Harrila ........................ 379/88.22 |
| 5,684,873 A | | 11/1997 | Tiilikainen |
| 5,710,810 A | | 1/1998 | Tiilikainen |
| 5,805,084 A | | 9/1998 | Mannisto |
| 5,946,386 A | * | 8/1999 | Rogers et al. ............ 379/265.09 |
| 6,072,868 A | | 6/2000 | Irvin |
| 6,662,026 B1 | | 12/2003 | Cordray et al. |
| 6,751,481 B2 | | 6/2004 | Chen et al. |
| 6,757,376 B1 | | 6/2004 | Yoon |
| 6,766,017 B1 | | 7/2004 | Yang |
| 6,771,980 B2 | | 8/2004 | Moon |
| 7,020,280 B2 | | 3/2006 | Wang |
| 7,085,369 B2 | | 8/2006 | Wang |
| 7,092,671 B2 | | 8/2006 | Lunsford et al. |
| 7,099,684 B2 | | 8/2006 | Cowsky et al. |
| 7,103,168 B2 | | 9/2006 | Bedingfield et al. |
| 7,190,975 B2 | | 3/2007 | Rho |
| 7,455,304 B2 | | 11/2008 | Porter |
| 7,720,037 B2 | | 5/2010 | Bill |
| 7,783,305 B2 | | 8/2010 | Ross et al. |
| 2003/0181224 A1 | | 9/2003 | Peng et al. |

(Continued)

OTHER PUBLICATIONS

Yeargin, Stephen, "iPhone Feature Request: Prevent Accidental Dialing," Oct. 12, 2008.

(Continued)

*Primary Examiner* — Quynh Nguyen
(74) *Attorney, Agent, or Firm* — Oppedahl Patent Law Firm LLC

(57) ABSTRACT

What is addressed is the problem of dialing telephone numbers stored in the memory of a telephonic device at inopportune and/or inappropriate times for the contacts in question. A telephonic device's database may incorporate means for flagging selected contacts or contact phone numbers for calling-confirmation step(s) to prompt the user to ensure that an outgoing call is appropriate. Alternatively, a contact's local time and/or local time zone may be displayed when browsing a contacts list and/or upon call-initiation to the contact. The proposed solutions encompass communication devices that use buttons, switches, dials, wheels, joysticks, track sticks, trackballs, keypads, keyboards, touchpads, touch screens, voice-recognition commands, biometric-authentication devices, other input technology, or any combination thereof, and wired and wireless communication device accessories. Additionally, the proposed solutions can incorporate various contact-location technologies in order to facilitate automated determination of the current local time and/or time zone and/or vacation status for a contact.

34 Claims, 3 Drawing Sheets

(56) References Cited

U.S. PATENT DOCUMENTS

| | | |
|---|---|---|
| 2005/0026644 A1 | 2/2005 | Lien |
| 2005/0136971 A1 | 6/2005 | Nakajima |
| 2005/0136982 A1 | 6/2005 | Li |
| 2005/0175172 A1* | 8/2005 | Janssen .................. 379/440 |
| 2005/0197140 A1* | 9/2005 | Ruutu et al. ............ 455/456.2 |
| 2006/0030367 A1 | 2/2006 | Cowsky et al. |
| 2006/0046694 A1 | 3/2006 | Yu |
| 2006/0068786 A1 | 3/2006 | Florence |
| 2006/0227958 A1 | 10/2006 | Tschand et al. |
| 2007/0088839 A1* | 4/2007 | Yoakum .................. 709/228 |
| 2007/0155370 A1 | 7/2007 | Daigle |
| 2007/0248220 A1 | 10/2007 | Crandell et al. |
| 2008/0059649 A1 | 3/2008 | Bradley et al. |
| 2008/0064350 A1 | 3/2008 | Winkler |
| 2010/0075648 A1* | 3/2010 | Matsuoka et al. ............ 455/418 |
| 2010/0159942 A1* | 6/2010 | Lewis et al. ................ 455/456.1 |

OTHER PUBLICATIONS

Sullivan, Bob, "Perils of the Pocket Call" (online blog article), The Red Tape Chronicles (MSNBC), May 9, 2008, available at: http://redtape.msnbc.com/2008/05/post.html.

* cited by examiner

APPARATUS AND METHODS FOR PROTECTION FROM INAPPROPRIATE PHONE-DIALING

BACKGROUND

Since the advent of automated dialing in telephones (that is, "speed dialing"), the prospect of inadvertently dialing another party inappropriately (e.g., dialing a party at an inconvenient hour of the day, or dialing a party who, for one reason or another, should not be dialed at all) has increased. As cell phones have evolved, the possibility of inadvertent dialing of other parties has increased as the cell phones have gotten smaller. For example, "pocket calls" can be initiated by the simple bumping of a cell phone being carried within a user's pocket, as discussed, in the web article, "*Perils of the Pocket Call*", Red Tape Chronicles (MSNBC), Bob Sullivan, May 9, 2008, available at http://redtape.msnbc.com/2008/05/post.html:

Fix our phones!

But this is really a hardware design flaw. It's up to cell phone makers to improve their candy bars and innovate to save us from ourselves. Apple's iPhone has a decent strategy—a small locking button on the top turns off screen-touch functionality. Unfortunately, my fashionable iPhone friends tell me they often forget to hit the lock.

How about some sensible behavior monitoring? After two or three calls to the same number in quick succession, for example, the phone could be locked until the dialer proves it's not an accident. A simple keystroke challenge ("If you are a person, type 5634" or some such) would do the trick. So would a keystroke or finger gesture that would be required to "wake" up the phone at all, like a FIG. 8. The iPhone's mandatory swipe after unlocking is a good idea.

In the above-mentioned Red Tape article, the author proposes what virtually all others in the art propose—a means of completely locking-out a phone's dialing/keyboard capability until some sort of affirmative action is completed by the user to ensure that the keyboard/dialing event is not an accident. Additionally, the above-mentioned article does not consider any discrimination between contacts that should be subjected to extra confirmation or verification features.

However, in addition to accidental calls that are initiated through inadvertent physical interaction with a telephonic device, inadvertent calls are often initiated through a mere mental lapse. For example, a user in the Pacific Time Zone dials a colleague in the Eastern Time Zone (a three-hour difference) at 9:00 p.m. PST without the user realizing that the call is going to someone who may well be asleep at midnight EST. Another example might include the case where a user is or should be familiar with the schedule of a colleague, yet because of a mental lapse, the user dials the colleague at a very inconvenient and/or inappropriate time and/or place of location for that friend or colleague.

Of course, most users have a set of telephone numbers for which the user would not desire special calling-confirmation protections against inappropriate dialing and for which the imposition of extra security measures to allow an outgoing call to routine, trusted contacts would be considered an undue burden. Likewise, the consequences of inappropriately dialing an important business contact may be far more serious than the consequences of inappropriately dialing a friend or relative. No solutions in the art against inappropriate dialing make any mention of this consideration, let alone make an exception to confirmation or verification measures for routine, trusted user contacts, with the possible exception of emergency "911" dialing.

Many cell phone devices employ a keyboard "lock" to prevent accidental dialing. For example, some "BlackBerry" devices have a keyboard-locking capability that is disabled when depressing the roller ball on the device three times. Other similar solutions include the iPhone's "Sleep/Wake" button to disable the touch screen, which also requires that a user drag the "slider" on the touch screen after reactivation (i.e., "waking") to ensure that the "Sleep/Wake" button was not depressed accidentally. Some cell phones, however, rely on a purely physical constraint to prevent inadvertent keyboard operations; for example the T-Mobile Sidekick Slide, "T-Mobile Sidekick LX", and Samsung D807 each use a sliding cover that must be moved to expose the keyboard and make the keyboard available for operations. In addition, the EnGenius Durafon cordless phone family of products also feature a keyguard to prevent any inadvertent key operations. Notably, the above solutions all involved effectively completely locking-out the keypad/touchpad/touch screen from all operations.

Other proposed solutions involve the installation of software, such as "CellLock 1.4" (freeware produced by Mind-Warrior), which is used to completely deactivate a keyboard or touch screen until the designated "Unlock" button is pressed and a confirmation password is entered to unlock the entire keypad/touchpad/touch screen. Similarly, the Elecont Dialer (phone-dialer software for Windows Mobile) employs a comparable scheme to prevent accidental clicks on a keyboard/touchpad/touch screen. Smart Dialer 2.1 software by Netcom, intended for Pocket PC Windows Mobile 5.0, has a feature to switch-off the device upon call completion as a way to prevent accidental redial.

For many of the existing solutions involving a keypad/touchpad/touch screen lock, there is further the problem of receiving phone calls while the cellular telephone is in the locked mode. In most examples, to receive a phone call, the user simply answers the call as if the cell phone was in standby mode. However, upon termination of the call, the cell phone immediately reverts to the locked mode. After receiving a phone call, it is not unusual for a user to desire to make another phone call based on the discussion he or she just had. Since the cellular telephone is in the locked mode, the user must go through the steps to switch the phone to active mode. For many users, such a blanket lock-out policy within the phone simply is neither needed nor desired to guard against trusted, commonly called contact telephone numbers.

Predictably, makers of cell phones for young children have thought about the problem of accidental dialing. For example, Verizon's Migo cell phone is deliberately designed to allow the dialing of only a few telephone numbers entered into memory (presumably by parents) and to require two key presses for each call to guard against accidental dialing. To dial an emergency number, the call button must be held down for several seconds to guard against accidentally dialing 911 or the like.

Some have patented or applied for patent protection for inventions that included solutions to prevent accidental calling of telephone numbers. Some of these proposed solutions also encompass voice-dialing.

For example, U.S. Patent Application Publication No. 2007/0286398 A1 to Ramamoorthy et al., "Voice Recognition Dialing for Alphabetic Phone Numbers", discloses that the user initiating the voice-dialing may be prompted in some embodiments to repeat the telephone number; however, that type of verification simply lends itself to allow a user to simply repeat the telephone number without a calling-confirmation step to ensure that the user is actually aware of the party being dialed associated with that telephone number. Further, in very noisy environments such as motorcycle helmet phones, which must contend with wind noise, environmental noises may make it difficult for the user to hear the confirmation words that make up a spoken name, especially in systems wherein the spoken name is synthesized (often badly) by an automated speech-synthesis agent. Thus, the other approaches do not present a comprehensive solution for preventing or discouraging improperly recognized voice dials to important contacts at an inappropriate time.

Some in the art proposed to make use of intelligent call completion schemes to decrease the chance of wrong telephone numbers being dialed. See, for instance, U.S. Patent Application Publication No. 2006/0068786 to Florence, "Dialing services on a mobile handset and remote provisioning therefore", and U.S. Pat. No. 7,455,304 to Porter, "Telephone quick dialing and re-dialing". However, these types of solutions do not address the problem where there is no mis-entry of the format of an entered telephone number but where the user is in need of a mental prompt to ensure that certain parties are not inadvertently called at an inappropriate time.

U.S. Patent Application Publication No. 2006/0068786 to Yu, "Method and apparatus for automatically deactivating a keypad lock", proposes allowing the deactivation of the locking of a keypad by employing the detection of time delays between attempted key presses to determine whether a given key press is likely to be an inadvertent keying event. This solution also only involves a situation where a telephonic device's keypad/touchpad/touch screen is either locked or unlocked for all inputs. U.S. Patent Application Publication No. 2006/0030367 to Cowsky et al., "Method and apparatus for protecting against an inadvertent keystroke", also discloses the detection of time by detecting if a key remains depressed for a predetermined amount of time, and if so, keeping the phone in a standby, locked mode. Cowsky goes on to disclose that the keyboard can be re-enabled immediately after receiving a call, and the user may subsequently provide the proper response in answer to a visual prompt to re-enable to the keypad after completion of the incoming call.

Another approach which addresses the inadvertent dialing of telephone numbers is proposed by U.S. Pat. No. 6,662,026 to Cordray et al., "Apparatus and Method for Detecting and Handling Accidental Dialing on a Mobile Communication device". Cordray proposes monitoring outgoing and incoming voice levels in order to detect an absence of conversation in both directions for a specified period of time, after which the call is terminated. This approach does not come close to addressing the problem of preventing such inadvertent telephone calls in the first place.

In all of the disclosures mentioned above, and myriad similar disclosures in the art, none address the goal of providing a way to discriminately provide an additional layer of protection against dialing certain telephone numbers stored in the contacts database stored onboard a user's telephonic device (most typically a cellular phone) at an inappropriate time, nor the goal of providing said additional layer of protection with regard to the dialing of certain, trusted or close contact telephone numbers.

BRIEF SUMMARY

The present inventive concepts presented in this application are generally directed to the problem of inappropriately initiating a call or dialing telephone numbers that are stored in the memory of a telephonic device, resulting in undesired completed calls at an inappropriate time. Most often, this problem is experienced with cellular phones or similar communication devices because of the fact that users typically store many contact telephone numbers within the telephonic device's database, often with many numbers set up for speed dialing. Even for numbers not setup for speed dialing, many users need to be prompted to perform some sort of affirmative step to ensure that a dialed outgoing call is not a mistake, because of the potential adverse consequences of allowing such a call to go through at a time inappropriate for calling for a given party, such as at night, or after business hours on a weekday, or on a weekend, or on a holiday. At the same time, users need flexibility in their communications system such that they can conveniently call trusted and/or frequently called contacts without having to go through one or more calling-confirmation or verification steps.

In one embodiment, a database of contact telephone numbers contained in a user's cell phone will include a flag for one or more contact entries to indicate whether dialing a particular contact should be subjected to one or more additional outbound-call confirmation steps to prevent an inappropriate call. Other, non-flagged contacts (such as personal contacts) can remain "unlocked"; that is, no additional calling-confirmation to protect the user from calling those non-flagged contacts at an inappropriate time is provided. In an embodiment for those contacts flagged for one or more calling-confirmation steps, said one or more calling-confirmation steps requires a keystroke combination/confirmation step before a prospective outgoing call may be completed.

In one embodiment, this calling-confirmation step includes an operation as simple as prompting the user with the question, "Are you sure? (Y/N)", to which the user enters "Yes" or "No", or presses one or more buttons signifying the affirmative or negative. In another embodiment, the calling-confirmation step includes prompting the user to speak the word "Confirmed," or other word or group of words. In still another embodiment, this calling-confirmation step includes prompting the user to simultaneously press a fixed or random combination of keys, to enter a fixed or random sequence of keys, to speak one or more fixed or random numbers, letters, or words, or any combination thereof.

In another embodiment, this calling-confirmation step includes prompting the user to enter a confirmation code; to speak a confirmation word; to speak a phrase; to speak a numeric sequence; to actuate a graphical user interface element on a touch screen interface; to actuate a biometric-authentication device (e.g., a fingerprint reader, hand-measurement device, retinal scanner, etc.); to actuate a physical control such as a switch, button, dial, wheel, joystick, track stick, or trackball; or any combination of the above. One skilled in the art will appreciate that any speech recognition associated with the recognizing the speech inputs discussed herein may be performed locally by a communication device and/or an associated accessory or peripheral, or remotely by a speech-recognition agent on a remote server or by other remote communications infrastructure.

Additional embodiments may apply one or more calling-confirmation steps for cases where the prospective outgoing call is directed to a contact whose local time makes it an inappropriate time to be initiating a call to that contact. For the purposes of determining the contact's local time, the contact's geographical location is based on the assigned locations associated with the country code, area code, or other regional codes within a selected phone number associated with the contact in question. In an alternative embodiment, the contact's geographic location is based on address data stored within the user's phone, or stored in an online database or received from an information service. In another alternative embodiment, the local time or time zone associated with a contact may be explicitly stored in a record associated with the contact. In still another alternative embodiment, the contact's geographic location is based on one of several existing and emerging real-time or near-real-time Location-Based Services.

In one embodiment, the contact's local time is determined by applying an algorithm which adjusts the UTC (Coordinated Universal Time) according to time zone. In an alternative embodiment, contact's local time is determined by computing the relative difference between the user's time zone and the contact's time zone. In yet another alternative embodiment, the local time for a given time zone or a given contact is looked up by contacting a remote cellular or online time service. In an embodiment, the user's cell phone display presents the user with the notification of what the time is locally for the contact in question and prompt the user with the question as to whether the user wishes to continue with the call. In one embodiment, if the user opts to not complete the telephone call after the prompt, then the user is further given the opportunity to enter in a time and date for the user's cell phone to prompt the user to try and make the outgoing call to the contact in question again.

Importantly, it should be noted that the principles behind each of the systems and methodologies disclosed herein can generally be applied to communication devices and telephonic dialing systems that are based on buttons, switches, dials, wheels, joysticks, track sticks, trackballs, keypads, touchpads, touch screens, voice-activated systems, biometric-authentication devices, or other inputs, or any combination thereof. In addition, the principles behind each of the systems and methodologies disclosed herein can generally be applied to communications accessories which allow the configuration or initiation of communications calls alone, or in conjunction with another communication device.

DETAILED DESCRIPTION

Figure 1:
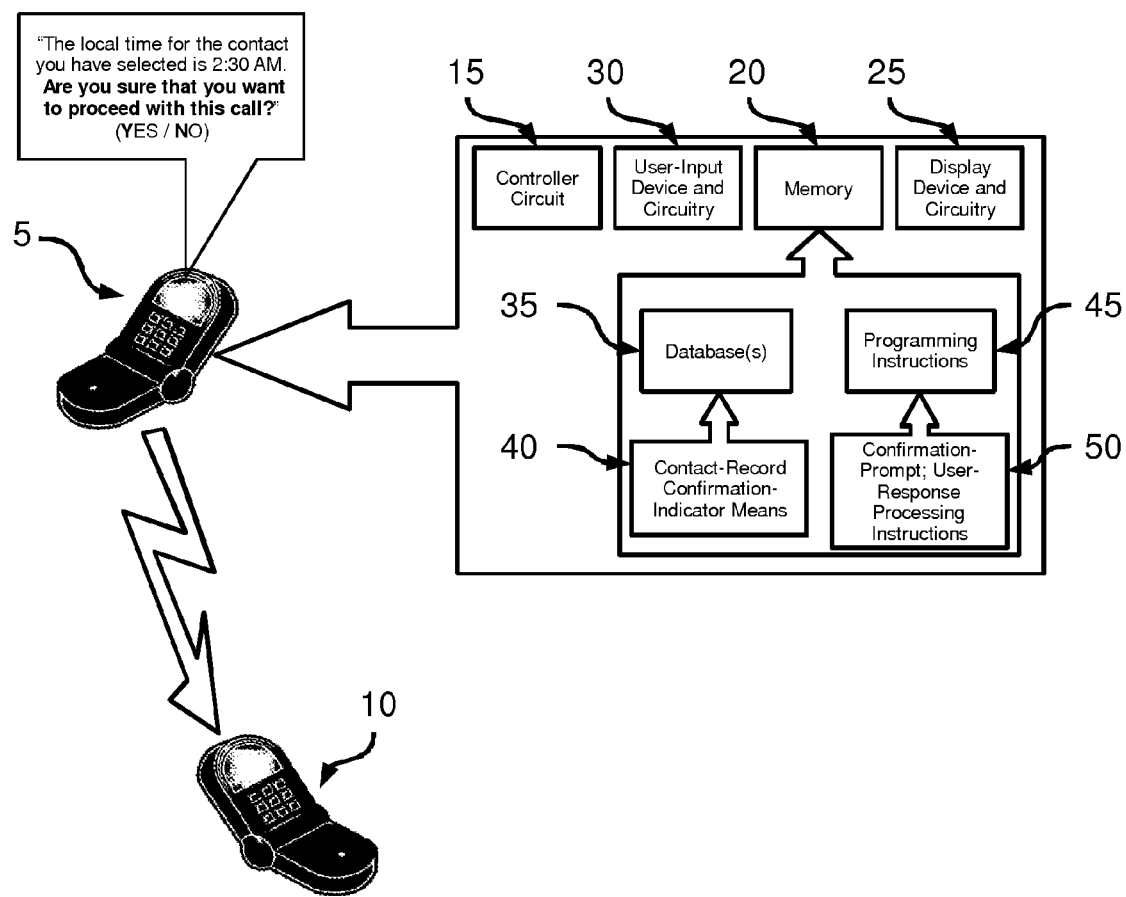
FIG. 1 depicts one embodiment of a system for detecting and preventing an inappropriate outgoing communications call.
Figure 2:
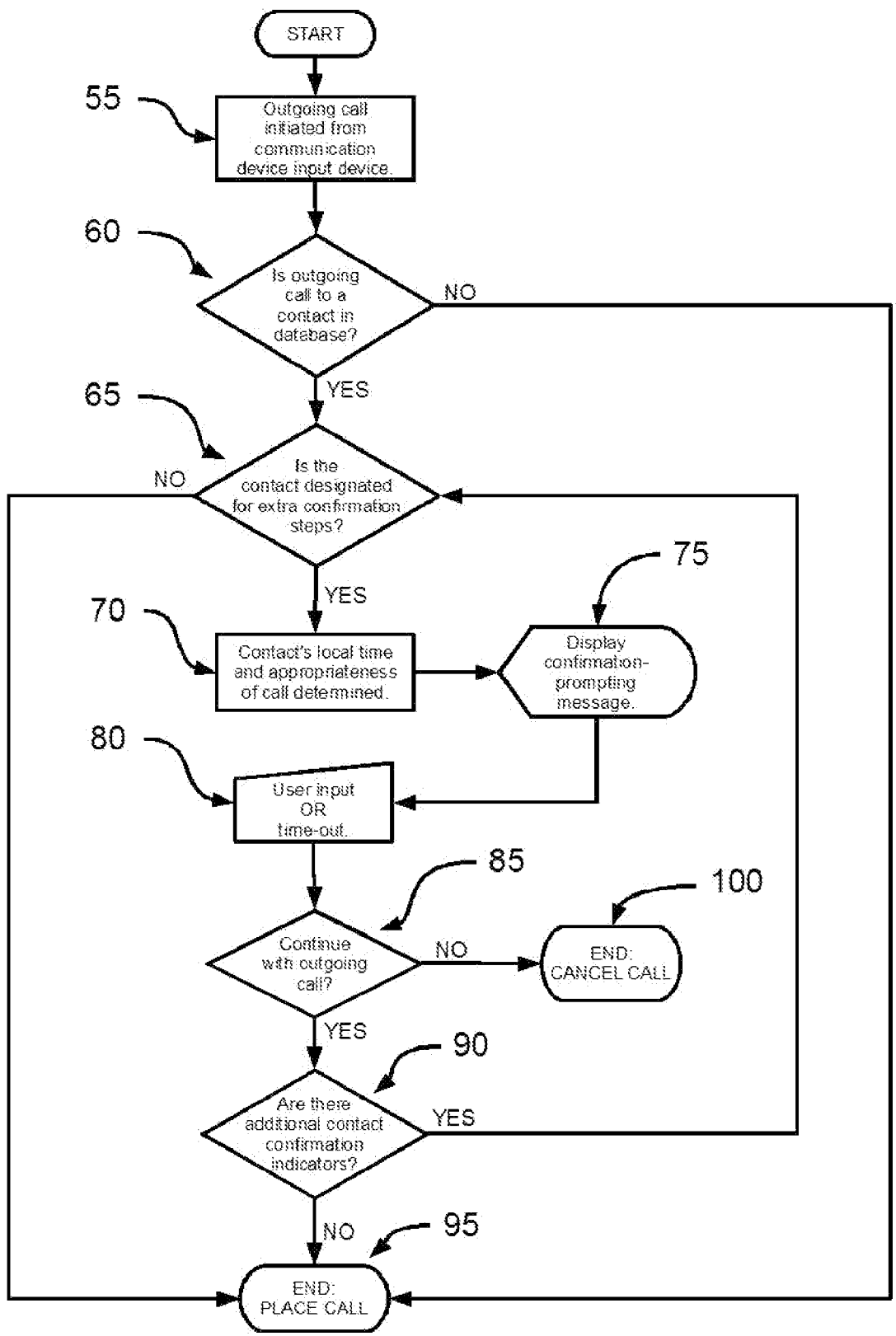
FIG. 2 depicts the operational flow of the operations performed in accordance with one embodiment of the claimed invention.

Refer to FIGS. 1 and 2. One exemplary embodiment of the claimed invention is generally directed to the problem of dialing telephone numbers that are stored in the memory of a telephonic device at an inappropriate time, resulting in undesired completed calls. Most often, this problem is experienced with cellular phones or similar communication devices because of the fact that users typically store many contact telephone numbers within the telephonic device's database, often with many numbers set up for speed dialing. Even for numbers not setup for speed dialing, many users need to be prompted to perform some sort of affirmative step to ensure that a dialed outgoing call is not a mistake, because of the potential adverse consequences of allowing such a call to go through late at night or at some other inopportune time to a given party. At the same time, these users may need flexibility in their communication system such that they can conveniently call 24-hour numbers and/or trusted and/or frequently-called contacts without having to go through one or more calling-confirmation steps.

Designating Certain Contacts for Extra Calling-Confirmation Steps

In one exemplary embodiment, a database (35) of contact telephone numbers stored in the onboard memory (20) of a user's communication device (5) includes a means to designate certain contact entries (40) to be subjected to one or more outbound-call confirmation steps to prevent an inappropriate call (50). Other, non-designated contacts (such as personal contacts, businesses which are open around the clock, phone numbers to access information services, voicemail boxes, or other automated services, etc.) can remain "unlocked"; that is, no extra calling-confirmation to protect the user from calling those non-flagged contacts is provided. Several different strategies can be employed to designate one or more contact records for one or more calling-confirmation steps. For example, a database of contact records (35) can include a data field, Boolean, bit-flag character, column, object, or other data element to act as a "flag" (40) to designate a given record for one or more calling-confirmation steps.

In an alternative embodiment, a separate calling-confirmation database table (35) with a subset of contact records represented in the main contact database (35) that stores contact records can be used, wherein the contact records listed in the separate calling-confirmation database table are contact records required to be subject to one or more calling-confirmation operations before allowing an outgoing call to the associated contact to be dialed to initiate a call attempt.

In another alternative embodiment, a separate calling-confirmation database table (35) with a subset of contact records represented in the main contact database (35) that stores contact records can be used, wherein the contact records listed in the separate calling-confirmation database table (35) are contact records that are not subject to one or more calling-confirmation operations before allowing an outgoing call to the associated contact to be dialed to initiate a call attempt.

In an embodiment, a user can browse the user's contact list and view a contact along with associated time-zone designation shown associated with the contact's listing, instead of (or even in addition to) a geographical listing (e.g., PST in place of California, EST instead of New York, etc.). Further, in one embodiment, a given contact listing can be rendered in bold and/or red text, or with some other visual cue, to emphasize the inappropriateness of calling a given contact at the current time. Note that the user also can see each contact's local-time info before even initiating an outgoing call; that is, the user is still just browsing through his or her contacts list when this data is displayed. For example:

| Name | Time | Locale |
|---|---|---|
| Tom | 10:16 AM | California |
| Dick | 1:16 PM | New York |
| **Harry\*\*\*\*** | **3:16 AM\*\*\*\*** | **Tokyo\*\*\*\*** |

In the above exemplary Contacts List display, the user browsing the list would note that the listing for Harry has visual cues to help indicate to the user that it probably would be inappropriate to call Harry at 3:16 AM.

In another embodiment, a user can browse the user's contact list and view the calling-confirmation settings associated with each contact.

In yet another embodiment, the user is given the ability, through the user's communication device, to configure one or more contact records for desired calling-confirmation status (40). In a further embodiment, the user is prompted to confirm desired changes to a contact's calling-confirmation configuration before a change is committed by the system.

Regardless of which method is used to designate a given contact record for one or more calling confirmation steps, it should be noted that such a designation is not only limited to a single indicator (40) associated with a contact record to define the one or more calling confirmation step(s) to be applied (50). For instance, it might be desirable to have the capability of "courtesy" calling confirmation steps (50) to help prevent an inappropriate call to a given contact at an inappropriate time of day. In one particular embodiment, a user might be aware of certain times or dates to not call a given contact and thus enters in such limitations for the contact in the user's communication device. In another embodiment, the system is programmed (45) to assume that certain time periods are customarily considered inappropriate to call someone (for instance, calling a contact at 2:00 a.m. at the contact's locality would probably not be appreciated; similar restrictions for the home or cellular phone numbers of business contacts on weekends and/or holidays may also be appropriate). The system thus launches one or more calling confirmation steps for certain outgoing calls if the perceived locality of the contact is such that a blocked-out time period is indicated. Of course, the system may be configured (45) to detect multiple designations for calling confirmation such that for certain outgoing calls to designated contacts, a user is first prompted with a calling confirmation message (50) of something along the line of, "Are you sure you want to call So-and-So?" Assuming that the user enters an affirmative response, the system then might perceive that the contact is presently located in a time zone such that the outgoing call may be inappropriate, thus prompting the user again (50) to let the user know of the time-zone differences involved and/or to verify that the user really does want to place the call regardless of the time of day for the contact in question. Alternatively, the system can be configured to present only one calling confirmation challenge when multiple conditions triggering additional calling-confirmation steps are present.

Of course, the system can be configured (45) to perceive a contact locality by any of several methods. One method is to assign a time zone or local time based solely on which time zone is associated with the country code, area code, and/or other region code within a selected telephone number associated with the contact. In an embodiment, a given contact may have a plurality of phone numbers with differing region codes, and thus a given contact may have a plurality of associated local times and/or local time zones. Which of these local times or time zones is relevant may thus depend on which phone number associated with the contact has been selected for dialing by the user. In an alternate embodiment, an address associated with a given contact (e.g., stored within the user's phone, stored in an online database, received from an information service or remote server, etc.) can be used to determine the time zone or local time by looking up or computing the time zone or local time associated with the location using software on the phone, and/or using software on a remote server. In another alternative embodiment, the time zone or local time associated with a contact may be explicitly stored in a record associated with the contact.

Given that a given contact could be traveling in a different time zone than that associated with the contact's telephone number, home, business, or vacation address, or home, business, or vacation time zone, other means to determine or at least approximate the contact's location for the purpose of assigning a time zone or local time can be used. Such methods that are known in the art include, but are not limited to: GPS-based Location-Based Service, Cell Identification, Enhanced Cell Identification, Time Difference of Arrival (TDOA), Time of Arrival (TOA), Angle of Arrival (AOA), Location Signature, Electronic Terrain and Obstacle Data (ETOD), Enhanced Observed Time Difference (E-OTD), Advanced Forward Link Trilateration (A-FLT), Timing Advance/Network Measurement Report (TA/NMR), Assisted GPS, Social Network Integrated Friend Finder (SNIFF), or any combination thereof. Further, these services may operate alone in a contact's communication device, or may be operate in conjunction with a remote device by means of a short-range radio technology (e.g., Bluetooth and Ultra-Wideband ("UWB")) or other electromagnetic communications technologies. Many of these known technologies are summarized at the following websites: http://en.wikipedia.org/wiki/Location-based_service#Locating_methods, http://en.wikipedia.org/wiki/GSM_localization, and https://www.sniffu.com/us/.

In one particular embodiment, a contact's present time zone or local time is determined by configuring the database in the user's communication device to accommodate the entry of the contact's calendar data, which includes scheduled locality information and which the system can use to assign a given contact a perceived time zone or local time. The contact's calendar data may be entered manually (30) by the user, or entered automatically upon receipt of the contact calendar data by the communication device from either a communications event from the contact or from downloading of the information from another computer system or online service (e.g., Google Calendar) that contains the contact's calendar data. This type of calendar-based approach also allows a warning message and/or confirmation step to discourage calling a client or business contact while he or she is on a scheduled vacation, for example, and thus may preclude bothering a client or business contact on his or her vacation. Additionally, such a warning message and/or confirmation step may allow the user to discover the contact's "on vacation" status without the user having to listen to a lengthy voicemail greeting explaining the contact's vacation schedule.

In an embodiment, in addition to approximating the selected contact's geographic location and thus current time zone or local time, it might be desirable to perform the same calculation for the user using any of the technologies discussed above or any technologies known in the art. For example, after an evening of relatively heavy social drinking, the user's local time zone could be used to intercept the user's attempt to initiate an inappropriate call late on Friday night based on the user's local time.

In an embodiment, if the contact's local time or local time zone cannot be conclusively determined using one of the methods disclosed herein, one or more alternative methods disclosed herein may be used as a backup. In one particular embodiment, a hierarchy, ordered list, or other data structure indicating preference order may be stored in a device to indicate which methods should be attempted before others. In another embodiment, preferences as to which local time determination method(s) or local time zone determination method(s) should be relied upon over other methods may be configured by the user.

In one embodiment, if the contact's local time or local time zone cannot be conclusively determined, the contact's local time or local time zone is assumed to be the same as the user's.

In one embodiment, the contact's current local time or "on vacation" status can be displayed when the contact is selected for viewing in the address book of the communication device. Alternatively or additionally, the contact's local time or "on vacation" status can be displayed while the call is being dialed and/or is connected. A variation on this concept has the display including an indication of what day it is for that contact. Such functionality can be useful for scheduling purposes. In addition, these options can be useful to help the user to give a time-appropriate greeting when calling a customer or other contact. For example, a user in New York at 1:16 P.M. may then greet a contact in California with "Good morning!", a greeting appropriate to the contact's local time, even though it is afternoon in New York.

Implementation of One or More Calling-Confirmation Steps

In one embodiment, for outgoing calls to those contacts designated for one or more calling-confirmation or verification steps (40), the programming of the user's communication device (45) causes the user to be visually prompted (50)(70) with a message and/or some other visual prompt (50)(70) on the communication device's display (25)(70). This visual prompt may include an identifier for the contact in question, wherein that identifier can be a name, a nickname, a codeword, a number, or some combination thereof. In another embodiment, an audio prompt (50) can be used to prompt the user with a confirmation request. This audio prompt may include an audio identifier for the contact in question, wherein that audio identifier can be a name, a nickname, a codeword, a number, or some combination thereof. In still another embodiments, a visual prompt (50)(70) can be accompanied by an audio prompt (50). The prompt requires the user to acknowledge the prompt in some way, such as by providing an affirmative entry (30)(75) of some sort of confirmation input to confirm the user's desire to make the outgoing call—that the prospective outgoing call is an appropriate attempt by the user to complete the call. In one embodiment, the user can also enter (30)(75) a negative response or other escape sequence to cancel the call. However, if the user provides no recognized response to the prompt then the call may be automatically canceled. In another embodiment, if the user provides no recognized response to the prompt within a predetermined/programmed period of time, then the call may be automatically canceled.

In one embodiment, if the user enters an unrecognized response, the user may be prompted to re-attempt to enter a calling-confirmation input. In a further embodiment, the user may be given one or more options, such as to cancel the call attempt, or to re-attempt to enter a calling-confirmation input.

In an embodiment, in the case of a user response to cancel an outgoing call in response to a prompt based on time zone/local time/vacation considerations for the selected contact, the system can be programmed (45) to prompt the user to reschedule the outgoing call (50)(70), which would cause another prompt to launch at the user-inputted (30)(75) rescheduled time and date.

Of course, if a dialed contact is not designated for one or more calling-confirmation steps, then the system permits the outgoing call to be attempted as it normally would, without said one or more calling-confirmation steps.

In one embodiment, the communication device's programming instructions (45) can cause the disabling of any speed-dialing capability associated with a contact designated for one or more calling-confirmation steps.

Types of User Confirmation-Response Entries

The types of entries of calling-confirmation input (30)(75) received from the user in answer to the calling-confirmation prompt (50)(70) will vary as a function of the type of user interface (30, 25) for the communication device. For communication devices that rely primarily on keypad, keyboard, touchpad, or touch screen entry, the user response to enable an outgoing call can require a specific calling-confirmation code, such as an alpha-numeric password, alpha-numeric phrase, swipe of a touchpad, or actuation of a graphical user interface element such as a slider bar. In one embodiment, the user entry can require the simultaneous pressing of at least two-keys and/or buttons, the combination of which may involve two keys or buttons that are not proximal to each other to ensure that the simultaneous pressing is deliberate. In another embodiment, a similar scheme could be applied for a touch screen or touchpad, wherein one or more of the at least two keys or buttons in the combination press are graphical in nature.

In an embodiment involving a touch screen, the user input (75) required to enable an outgoing call subjected to one or more calling-confirmation steps can require that the user provide an affirmative indication and/or negative indication of user intent by way of depressing a button or other mechanical control element on the communication device, followed by the user's manipulation of a graphical user interface control element on the touch screen, thus combining one or more graphical "virtual" control elements with one or more mechanical control elements.

In another embodiment, user input for dialing can be by way of speech-recognition dialing; therefore, the user input (75) to respond to the calling-confirmation prompt (50)(70) may also be by way of speech recognition of voice commands, or by way or a combination of voice commands and the deliberate actuation of a mechanical control element or graphical-control element. Further, the user may provide the confirmation-response input (75) by way of a second wireless-input device, such as a Bluetooth device.

In another embodiment, the user can designate one or more contacts as belonging to one or more categories. Exemplary categories may include, but are not limited to, "Personal," "Clients," "Customers," "Colleagues," "Businesses," "Family", "Friends," "Important," "VIP," "Local," "International," "Domestic," etc. In another embodiment, the user can designate one or more individual numbers associated with a contact as belonging to one or more categories. Exemplary categories may include, but are not limited to, "Home," "Cellular," "Mobile," "Work," "Office," etc. In one embodiment, a given contact, or given number associated with a given contact, may belong to a plurality of categories at a given time. In another embodiment, a given contact, or given number associated with a given contact, may belong to only as many as one category at a given time. Using categories, calling confirmation can then be globally activated or deactivated by the user for an entire category of contacts. For example, when the user leaves work at 5:00 PM on a Friday night, he or she may turn on calling confirmation for all users belonging to the "Clients" category, but leave calling confirmation off for all users belonging to the "Friends" category. In another example, the user may activate calling confirmation for the "International" category of contacts; that is, the category containing all contacts whose local times are less likely to be known to the user.

In one embodiment, the user can categorize personal numbers of a contact (e.g., home or cellular numbers) differently from business numbers of that contact (e.g., businesses or business phone numbers). Alternatively, the communication device may categorize these numbers by default, and in an embodiment, the user may override those defaults.

In one embodiment, the communication device may give all new or uncategorized contacts a default category. In another embodiment, the communication device connects with an information service (such as a telephonic directory assistance service, a web-based information directory, etc.) to look up a new or uncategorized contact number, and if the number shows up as a business number (e.g., the local pizza restaurant, the main office number of a given client or customer, etc.), then the communication device will assign the contact to a category which does not require time-related checks and/or confirmation steps.

In an embodiment, confirmation can be selectively enabled or disabled for a given category of numbers and/or contacts. This selective enablement or disablement can occur as a result of a default setting for such a category, a default which can subsequently be overridden on a per-number or per-category basis by the user, or a user-specified setting. Therefore, for example, a user can still call the local grocery store to get its off-hours recording to find out its hours of operation, and a user can call the user's lawyer's office with the intent to leave an after-hours voicemail without being hit with an annoying confirmation step. In neither of the above cases would the user actually be disturbing anyone due to the late hour; therefore, there would be no need to go through a calling-confirmation step. In another embodiment, emergency numbers and/or emergency contacts (e.g., 911) are automatically exempted from time-related checks and/or confirmation steps. In still another embodiment, numbers for automated services (e.g., the phone number to reach an information service, cellular service numbers such as those beginning with a *, or other numbers) may be exempted from confirmation by default. Such numbers exempted by default may be pre-stored in the memory of the device prior to purchase, or may be received and stored by the device at a later time.

In another embodiment, a time-period specification may be received from the user which specifies times during the day or week wherein calling confirmation is automatically required for a given contact or group or category of contacts. This allows certain contacts or types of contacts (e.g., business contacts) to require one or more calling-confirmation steps outside of certain hours (e.g., business hours). The time-period specification may be used in one or more of a variety of ways. In one exemplary embodiment, a time-period specification is used to automatically activate the requirement for one or more calling-confirmation steps during a specified time period. In another exemplary embodiment, a time-period specification is used to automatically deactivate the requirement for one or more calling-confirmation steps during the specified time period. In yet another exemplary embodiment, a time-period specification is used to automatically activate the requirement for one or more calling-confirmation steps outside of the specified time period. In still another exemplary embodiment, a time-period specification is used to automatically deactivate the requirement for one or more calling-confirmation steps outside of the specified time period. In alternative embodiments, contacts are logically grouped by perceived current geographical location, and those discrete logical groups of contact records are subjected to the time-period specification in one or more ways as described above.

In one embodiment, the user can simultaneously enable and/or disable calling confirmation for a plurality of contacts or numbers by changing the mode of operation of the communication device. This may be accomplished by actuating a mechanical control element or a sequence thereof, and/or manipulating a graphical-control element, and/or inputting an audio command. This type of "global" control allows quick behavior changes to allow for situations which are especially conducive to time-inappropriate calls (e.g., the user is in Japan, while the user's friends, family, and business are in Colorado; further, the user is jetlagged and more likely to forget that his contacts in Colorado are likely asleep). In an embodiment, a calling-confirmation code or other calling-confirmation step is required to simultaneously enable and/or simultaneously disable calling confirmation for a plurality of contacts.

A System for Detecting and Preventing an Inappropriate Outgoing Communications Call Referring again to FIGS. 1 and 2, an exemplary embodiment encompasses a system for detecting and preventing an inappropriate outgoing communications call initiated from a communication device (5); said communication device comprising an onboard controller circuit (15), onboard memory for storing contact information (20), including contact names and telephone numbers (optionally, additional data may be stored, such as an address associated with a contact, geographic location data associated with a contact, a time zone associated with a contact, a local time associated with a contact, or other data, or a combination of one or more of the above), a display device (25), and a user-input device (30); the system comprising at least one database (35) stored in said onboard memory (20) containing at least one contact record, said record having at least one associated confirmation-indicator (40) to indicate whether a given contact record should be subject to one or more calling-confirmation steps before allowing an outgoing call to the associated contact, and programming instructions stored on a computer-readable medium to be executed by said controller circuit such that when a user attempts to initiate a call to a stored contact or contact telephone number, and such that if said stored contact or contact telephone number has an associated confirmation-indicator, then a confirmation-prompting message is presented to said user, and wherein said user is required to enter an affirmative indication to enable said attempted outgoing call to be actually dialed.

In one embodiment, programming instructions (45) are stored on a computer-readable medium to be executed by said controller circuit (15) such that when a user attempts to initiate a call (55) to a stored contact or stored contact telephone number (60) selected from said first communication device (5), and such that if said stored contact or stored contact telephone number has an associated and enabled confirmation-indicator (40)(65), then the contact's local time and/or time zone is calculated to determine whether the attempted outgoing call is appropriate (70) and if not, then one or more calling-confirmation steps is required to allow the outgoing call to be placed. Then, said display device (25) displays a calling-confirmation-prompting message (50)(75) to said user, wherein said calling-confirmation-prompting message (50)(75) conveys to said user a need to verify that said attempted outgoing call is a valid and appropriate or otherwise desirable attempt to call said selected contact or contact telephone number. In an embodiment, the user is required to enter (30)(80) an affirmative indication (50)(85) according to said calling-confirmation-prompting message (50)(75), and a predetermined or randomly-generated calling-confirmation response (50)(85) to enable said attempted outgoing call to be actually dialed (95), and wherein if said user enters (30)(80) a negative indication according to said confirmation-prompting message (50)(85) and a predetermined calling-confirmation response (50)(85) or if said user fails to respond to said calling-confirmation-prompting message (50)(75)(within a predetermined period of time (80) in one embodiment, or fails to respond at all, in an alternative embodiment), then said attempted outgoing call is cancelled (100). In another embodiment, if said stored contact telephone number has an associated calling-confirmation indicator (40) indicating that no calling confirmation is required to allow the outgoing call to be placed (65), or if said user provides an affirmative response to said calling-confirmation-prompting message, then said attempted outgoing call is allowed to proceed (and assuming connectivity, reception, network authentication, or other conditions sufficient to place a call as known in the art are met, placed to said selected contact's communication device (10)(95)).

In another embodiment, said confirmation-prompting message (50)(75) comprises an audio alert such as a buzzing sound, a beeping sound, an audio tone, a spoken warning, a musical interlude, or other audio output which may be generated on the communication device, or a combination of one or more of the above. In still another embodiment, the confirmation-prompting message (50)(75) comprises a visual alert combined with such an audio alert.

In an embodiment, said user-input device comprises one or more controls selected from the group consisting of buttons, switches, dials, wheels, joysticks, track sticks, trackballs, keypads, touchpads, touch screens, voice-activated systems, and biometric-authentication devices.

In another embodiment, said user-input device is a keypad and said affirmative indication is entered by said user by way of at least one keypad entry.

In another embodiment, said user-input device is a touchpad or touch screen and said affirmative indication is entered by said user by way of user's manipulation of a graphical control on said touch screen.

In another embodiment, said user-input device is a speech-recognition device and said affirmative indication is entered by said user by way of providing at least one voice command.

In another embodiment, said one or more calling-confirmation steps for contact records or contact numbers with an associated confirmation indicator is automatically enabled when speech-recognition dialing is being used.

In an embodiment, the user can customize at least one contact record by configuring said at least one associated calling-confirmation indicator (40) for a contact record. This configuration may comprise a wide variety of user interface options, including a graphical user interface (e.g., checkbox, menu option, radio button, or other graphical user interface element). In one embodiment, said user is prompted (50) to confirm said customization of a given contact record's said at least one associated confirmation-indicator (40). In one embodiment, different calling-confirmation indicators (40) may be set for each phone number associated with a contact record.

In a further embodiment, said programming instructions (45) allow said user to control whether all said calling confirmation of outgoing calls for contact records with an associated confirmation indicator (40) is enabled or disabled by entering a predetermined confirmation code. Alternatively, said programming instructions (45) allow said user to control whether all said calling confirmation of outgoing calls for contact records with an associated confirmation indicator (40) is enabled or disabled by entering a randomly generated confirmation code (i.e., the communication device presents a randomly generated sequence of numbers, letters, or words to be input into the communication device, or spoken aloud, to enable the attempted call to proceed).

In another embodiment, said at least one associated confirmation-indicator for said at least one contact record comprises a flag that indicates to said programming instructions whether a given contact record or number associated with a contact record should be subject to one or more calling-confirmation steps before allowing an outgoing call to the associated contact to be dialed to initiate a call attempt.

In another embodiment, said at least one associated confirmation-indicator for said at least one contact record comprises a confirmation database table with a subset of contact records represented in said at least one database.

One skilled in the art will appreciate that relevant contact data, customized confirmation-configuration data, or other data may be stored on a detachable memory card, media card, or remote server without departing from the scope of the claimed embodiments.

A Method for Preventing an Inappropriate Outgoing Communications Call

Figure 3:
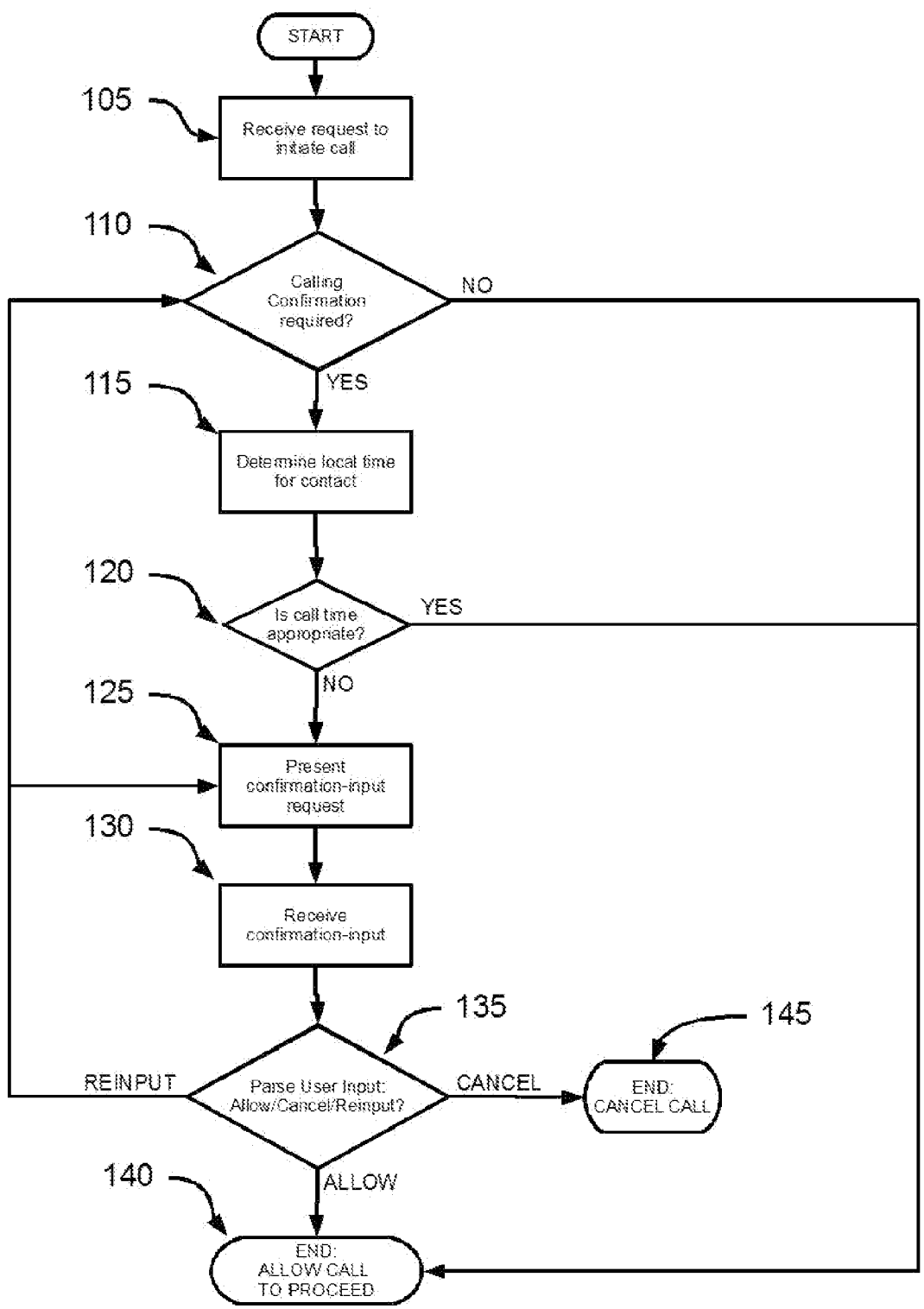
FIG. 3 depicts the operational flow of the operations performed in accordance with one embodiment of the claimed invention.

FIG. 3 illustrates the operational flow of the operations performed in accordance with one embodiment of the claimed invention in which a communications call is processed to prevent an inappropriate outgoing communications call initiated from a communication device. A receive operation (105) receives a request from a user to initiate a communications call to a given contact. In one embodiment, the request is received directly by the communication device (e.g., by the dialing of a phone number, by the dialing of *69 or other dialing code which attempts to call the last number that called the communication device, by the selection a phone number, by the selection of contact from an address book, by the selection of a contact or phone number from a call log or other list of recently dialed calls, etc.). In another embodiment, the request is received using a communication device accessory such as a wireless interface which allows the initiation of calls in conjunction with the communication device.

A determine operation (110) then determines whether calling confirmation is required for the selected contact and/or selected phone number associated with the selected contact (that is, the contact or number to which the user has initiated the communications call). In one embodiment, the determine operation (110) checks a database of contacts to check whether the selected contact or number is flagged for calling confirmation based on a flag, category membership, or other data property. In another embodiment, the determine operation (110) checks a database containing a subset of contacts to determine whether or not a given contact or number is flagged for calling confirmation.

If the determine operation (110) determines that calling confirmation is not required for the selected contact or number, then flow branches NO to an allow-call operation (140). The allow-call operation (140) then allows the communications call to proceed as it normally would on the communication device. In one embodiment, the communications call would be placed, dialed, or otherwise initiated. In another embodiment, additional other operations known in the art may be required before initiation of the communications call. Alternatively, if the determine operation (110) determines that calling confirmation is required for the selected contact or number, then flow branches YES to a determine-the-contact-local-time operation (115), after which an operation is performed to decide whether the contact's local time renders a call to the contact as appropriate (120). If appropriate, then flow branches YES to an allow-call operation (140). If the call is potentially inappropriate, then flow branches NO to a present-confirmation operation (125).

The present-confirmation operation (125) presents a confirmation-input request (125) to the user. In one embodiment, the confirmation-input request (125) indicates that confirmation is required for the selected contact or number by displaying a message to that effect on a text display of the communication device. In another embodiment, the confirmation-input request (125) indicates that confirmation is required for the selected contact or number by displaying a message or playing a video sequence to that effect on a graphical display of the communication device. In still another embodiment, the confirmation-input request (125) indicates that confirmation is required for the selected contact or number by playing an audio message to said effect on the speakers, headphones, or earbuds of the communication device, and/or on speakers, headphones, or earbuds located remotely from the device which are associated with a wired or wireless communications accessory. In one embodiment, the confirmation-input request (125) indicates a predetermined code which may be received from the user to allow the call to proceed. In another embodiment, the confirmation-input request (125) indicates a randomly generated sequence of inputs that may be received from the user to allow the call to proceed.

A receive-confirmation operation (130)(135) then receives a proper confirmation input before allowing the call to proceed (140). In one embodiment, the received input comprises one or more inputs from the communication device, such as a button press, a key press, a switch actuation, actuation of a dial, actuation of a wheel, actuation of a joystick, actuation of a track stick, actuation of a trackball, actuation of a graphical-control element in a graphical user interface, actuation of a biometric-authentication device, activation of a touchpad, activation of a touch screen, a spoken word or phrase or other vocalized sound, or any sequence or combination of one or more inputs such as these. In one embodiment, if an incorrect confirmation input is received (130), the receive operation (135) invites the user to try again. This may be accomplished by branching back to the determine operation (110), or branching back to the present operation (125), or by presenting a new confirmation-input request indicating that the entered confirmation input was incorrect. In an embodiment, the receive operation (130) is capable of receiving a call-cancellation request (135) which cancels the calling attempt (145).

If the receive operation (130)(135) receives a proper confirmation input, then the allow-call operation (140) then allows the communications call to proceed as it normally would on the communication device.

OTHER EMBODIMENTS AND VARIATIONS

One skilled in the art will appreciate that embodiments of the claimed technology can be applied to many different types of telephonic/communication devices such as cellular telephones, cordless telephones, vehicular communications systems, PDAs, smartphones, Bluetooth or other wireless or wired phone-dialing devices, video phones, Voice-Over-IP (VoIP) communication devices (such as a Skype phone), or other Internet phone technology, and any other present or future portable communication device capable of initiating a communication event to the owner or user of a remote communication device. Moreover, the principles underlying the embodiments disclosed herein can be applied to outgoing calls initiated from a button, switch, dial, wheel, joystick, track stick, trackball, keypad, touchpad, touch screen, voice-based dialing system, biometric-authentication device, or other input technology. Furthermore, it is probable that the principles underlying this embodiment can be applied to future communication devices that employ new means to initiate outgoing calls.

The various embodiments described herein are provided by way of illustration only and should not be construed to limit the scope of the inventive concepts discussed. Those skilled in the art will readily recognize various modifications and changes that may be made to the present invention without following the example embodiments and applications illustrated and described herein, and without departing from the true spirit and scope of the present invention, which is set forth and intended to be encompassed within the scope of the following claims.

The invention claimed is:

1. A method for preventing an inappropriate outgoing communications call initiated from a communication device, said method comprising the steps of:
   by said device, receiving a request from a user to initiate said call to a contact;
   by said device, determining a local time associated with said contact;
   by said device, determining whether said local time is inappropriate for initiating communication calls to said contact;
   by said device, if said local time is inappropriate for initiating calls to said contact, presenting a request to said user for entry of a confirmation input into said device;
   by said device, requiring said confirmation input from said user to be received by said device before allowing said call;
   by said device, allowing said user to designate one or more contacts, or to designate one or more phone numbers associated with said one or more contacts, as belonging to a category; and
   by said device, allowing said user to enable or disable said method for preventing an inappropriate outgoing communications call initiated from a communication device simultaneously for said one or more contacts, or for said one or more phone numbers associated with said one or more contacts, belonging to said category.

2. A method as defined in claim 1, further comprising the steps of:
   by said device, automatically designating one or more contacts, or to designate one or more phone numbers associated with said one or more contacts, as belonging to a category based on data received by said device from an information service; and
   by said device, allowing said user to enable or disable said calling-confirmation simultaneously for said one or more contacts, or for said one or more phone numbers associated with said one or more contacts, belonging to said category.

3. A method as defined in claim 1, wherein said presenting a request to said user for entry of a confirmation input further comprises presenting an indicator to alert the user of said local time associated with said contact.

4. A method as defined in claim 1, wherein said determining a local time associated with said contact further comprises determining a local time zone associated with said contact.

5. A method as defined in claim 1, wherein said local time is determined according to a regional code associated with said contact's telephone number.

6. A method as defined in claim 1, wherein said local time associated with said contact is determined according to a substantially real-time location-based service selected from the group consisting of GPS-based Location-Based Service, Cell Identification, Enhanced Cell Identification, Time of Arrival (TOA), Time Difference of Arrival (TDOA), Angle of Arrival (AOA), Location Signature, Electronic Terrain and Obstacle Data (ETOD), Enhanced Observed Time Difference (E-OTD), Advanced Forward Link Trilateration (AFLT), Timing Advance/Network Measurement Report (TA/NMR), Assisted GPS, and Social Network Integrated Friend Finder (SNIFF).

7. A method as defined in claim 1, wherein:
said communication device has a programmed calendar function;
said local time associated with said contact is determined according to a calendar schedule associated with said contact; and
said calendar schedule indicates said contact's scheduled location at a given date and time.

8. A method as defined in claim 1, wherein:
said communication device has a programmed calendar function; and
said calendar schedule indicates whether said contact is presently on vacation.

9. A method as defined in claim 1, wherein said determining a local time associated with said contact further comprises retrieving a time zone from a contacts database located in memory associated with said communication device.

10. A method as defined in claim 1, wherein said determining a local time associated with said contact further comprises receiving one or more local times, or one or more time zones, from a remote server.

11. A method as defined in claim 1, wherein said determining a local time associated with said contact further comprises receiving one or more local times from a local-time computation application residing on said device.

12. A method as defined in claim 1, wherein said determining a local time associated with said contact further comprises receiving one or more local times, or one or more time zones, from an information service.

13. A method as defined in claim 1, further comprising the step of:
if said user opts to enter a negative indication in response to said request for entry of a confirmation input, then, by said device, presenting a further prompt for a future time and date for said device to store,
wherein said stored future time and date is used by the programming of said device to cause a later prompt be presented to said user to remind said user to attempt to place said call to said contact again.

14. A method as defined in claim 1, wherein said request for confirmation input further comprises one or more operational steps selected from the group consisting of:
displaying a request for a confirmation input on a display device of said device;
playing an audio alert; and
playing a video alert.

15. A method as defined in claim 1, wherein said device-performed presenting request step and said device-performed required confirmation-input receiving step associated with a given contact can be enabled or disabled by said user.

16. A system for detecting and preventing an inappropriate outgoing communications call initiated from a communication device; said communication device comprising an onboard controller circuit, memory for storing contact information, including contact names and telephone numbers, a display device, and a user-input device; the system comprising:
programming instructions stored on a computer-readable medium to be executed by said controller circuit such that when a user attempts to initiate a call to a stored contact telephone number, then
a substantially real-time local time associated with said contact record is determined,
whether said local time is inappropriate for initiating communication calls to said contact is determined, and
if said local time is inappropriate for initiating a communication call to said contact, a confirmation-prompting message is presented to said user,
wherein said user is required to enter an affirmative indication to enable said attempted outgoing call to be actually dialed; and
wherein said user can customize at least one contact record by configuring at least one associated confirmation indicator associated with said at least one contact record.

17. A system as defined in claim 16, wherein said substantially real-time contact-record local time is determined using a process comprising a substantially real-time location-based service selected from the group consisting of GPS-based Location-Based Service, Cell Identification, Enhanced Cell Identification, Time of Arrival (TOA), Time Difference of Arrival (TDOA), Angle of Arrival (AOA), Location Signature, Electronic Terrain and Obstacle Data (ETOD), Enhanced Observed Time Difference (E-OTD), Advanced Forward Link Trilateration (A-FLT), Timing Advance/Network Measurement Report (TA/NMR), Assisted GPS, and Social Network Integrated Friend Finder (SNIFF).

18. A system as defined in claim 16, further comprising:
programming instructions stored on a computer-readable medium to be executed by said controller circuit that comprise a programmed calendar function;
data received by said communication device corresponding to said at least one contact record's calendar schedule indicating said contact's scheduled location at a given date and time or indicating that said contact is presently on vacation; and
said substantially real-time contact-record local time is determined using a selected contact's calendar schedule data.

19. A system as defined in claim 16, wherein said confirmation-prompting message is presented to said user using one or more output devices selected from the group consisting of said display device, a speaker, a headphone, and an earbud.

20. A system as defined in claim 16, wherein said user-input device comprises one or more controls selected from the group consisting of buttons, switches, dials, wheels, joysticks, track sticks, trackballs, keypads, touchpads, touch screens, voice-activated systems, and biometric authentication devices.

21. A non-transitory tangible computer-readable medium for use with a communication device, said medium comprising at least one program for preventing an inappropriate outgoing communications call initiated from a communication device, said at least one program comprising:
the capability of causing said device to be able to receive a request from a user to initiate an outgoing communications call to a contact;
the capability of causing said device to be able to determine a local time associated with said contact;
the capability of determining if said local time is inappropriate for initiating calls to said contact, and if so, then causing said device to present a request for a confirmation input to said user, and
causing said device to require said confirmation input to be received by said device before allowing said call; and
the capability of causing said device to be able to receive a request from a user to enable or disable said capability of determining if said local time is inappropriate for initiating calls to a contact, or for one or more phone numbers associated with a contact.

22. A method for displaying a contact's local time in a location associated with the contact's record in a contacts database used with a communication device, said method comprising the steps of:
- by said communication device, determining a local time associated with said contact;
- by said communication device, displaying an identifier associated with said contact on a display device; and
- one or more operational steps selected from the group consisting of:
  - by said communication device, displaying a local time associated with said contact on said display device, and
  - by said communication device, displaying an indicator that indicates that said contact is presently on vacation;
- by said communication device, allowing a user to designate a contact's record, or to designate one or more phone numbers associated with said contact record, to receive said method.

23. A method as defined in claim 22, wherein said identifier is selected from the group consisting of a proper name, a nickname, a business name, a code word, a telephone number, a phone number, and an alpha-numeric identification number.

24. A method as defined in claim 22, wherein said displaying local time comprises a display of said contact's local time zone designation.

25. A method as defined in claim 22, wherein said display of a given contact identifier and associated local time is enhanced with one or more visual cues when said given contact's local time would indicate that a call by the user at that point in time would be inappropriate.

26. A method as defined in claim 22, wherein said local time is determined according to a regional code associated with said contact's telephone number.

27. A method as defined in claim 22, wherein said local time associated with said contact is determined according to a substantially real-time location-based service selected from the group consisting of GPS-based Location-Based Service, Cell Identification, Enhanced Cell Identification, Time of Arrival (TOA), Time Difference of Arrival (TDOA), Angle of Arrival (AOA), Location Signature, Electronic Terrain and Obstacle Data (ETOD), Enhanced Observed Time Difference (E-OTD), Advanced Forward Link Trilateration (AFLT), Timing Advance/Network Measurement Report (TA/NMR), Assisted GPS, and Social Network Integrated Friend Finder (SNIFF).

28. A method as defined in claim 22, wherein:
- said communication device has a programmed calendar function;
- said local time associated with said contact is determined according to a calendar schedule associated with said contact; and
- said calendar schedule indicates said contact's scheduled location at a given date and time or indicates that said contact is presently on vacation.

29. A method as defined in claim 22, wherein said determining a local time associated with said contact further comprises retrieving a time zone from a contacts database located in memory associated with said communication device.

30. A method as defined in claim 22, wherein said determining a local time associated with said contact further comprises receiving one or more local times, or one or more time zones, from a remote server.

31. A method as defined in claim 22, wherein said determining a local time associated with said contact further comprises receiving one or more local times from a local-time computation application residing on said device.

32. A method as defined in claim 22, wherein said determining a local time associated with said contact further comprises receiving one or more local times, or one or more time zones, from an information service.

33. A method for indicating a local time associated with a contact upon initiation of a communication call by a communication device, said method comprising the steps of:
- by said device, receiving a request from a user to initiate said call to said contact;
- by said device, determining a local time associated with said contact; and
- by said device, presenting an indication to said user of said local time associated with said contact;
- by said device, allowing said user to designate one or more contacts, or to designate one or more phone numbers associated with said one or more contacts, as belonging to a category; and
- by said device, allowing said user to enable or disable said steps of determining a local time associated with said contact and presenting of an indication to said user of said local time associated with said contact simultaneously for said one or more contacts, or for said one or more phone numbers associated with said one or more contacts, belonging to said category.

34. The method of claim 33, wherein said presenting an indication to said user of said local time associated with said contact further comprises one or more operational steps selected from the group consisting of displaying a request for a confirmation input on a display device of said communication device and playing an audio alert.

* * * * *